US006921168B2

(12) United States Patent
Lindacher et al.

(10) Patent No.: US 6,921,168 B2
(45) Date of Patent: Jul. 26, 2005

(54) TRANSLATING CONTACT LENS HAVING A RAMPED RIDGE

(75) Inventors: Joseph Michael Lindacher, Lawrenceville, GA (US); Jordan William Hall, Atlanta, GA (US); Ming Ye, Fort Worth, TX (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 10/616,476

(22) Filed: Jul. 9, 2003

(65) Prior Publication Data

US 2004/0017542 A1 Jan. 29, 2004

Related U.S. Application Data

(60) Provisional application No. 60/398,485, filed on Jul. 24, 2002.

(51) Int. Cl.$^7$ ................................................. G02C 7/04
(52) U.S. Cl. .................... 351/160 R; 351/161; 351/177
(58) Field of Search ........................... 351/159, 160 R, 351/161, 160 H, 164, 168–9, 174, 177

(56) References Cited

U.S. PATENT DOCUMENTS

| 4,573,775 | A |   | 3/1986  | Bayshore ................ 351/161 |
| 4,618,227 | A |   | 10/1986 | Bayshore ................ 351/161 |
| 4,618,229 | A | * | 10/1986 | Jacobstein et al. ........ 351/161 |
| 4,874,234 | A |   | 10/1989 | Wichterle ............... 351/161 |
| 5,071,244 | A |   | 12/1991 | Ross ..................... 351/161 |
| 5,100,225 | A | * | 3/1992  | Rothe .................. 351/160 H |
| 5,764,339 | A |   | 6/1998  | Horton .................. 351/161 |
| 6,109,749 | A |   | 8/2000  | Bernstein ............... 351/161 |
| 6,773,107 | B2 | * | 8/2004 | Ye et al. ................ 351/161 |
| 2002/0021410 | A1 |   | 2/2002 | Ye et al. ................ 351/161 |

OTHER PUBLICATIONS

International Search Report, completed Jan. 20, 2003.

* cited by examiner

Primary Examiner—Jordan M Schwartz
Assistant Examiner—Jessica Stultz
(74) Attorney, Agent, or Firm—Jain S. Zhou; Robert J. Gorman

(57) ABSTRACT

The present invention provides a translating contact lens having a central axis, an anterior surface and an opposite posterior surface. The anterior surface includes an optical zone and a ramped ridge zone, which is disposed below the optical zone and capable of controlling contact lens position on an eye in primary gaze or translating amount across the eye when the eye changes from gazing at an object at a distance to gazing at an object at an intermediate distance or at a nearby object, or both.

48 Claims, 6 Drawing Sheets

TRANSLATING CONTACT LENS HAVING A RAMPED RIDGE

This application claims the benefit under 35 USC §119 (e) of U.S. provisional application No. 60/398,485 filed Jul. 24, 2002, incorporated by reference in its entirety.

This invention is related to contact lenses. In particular, the present invention is related to translating contact lenses each having a ramped ridge zone on the lower portion of the anterior surface that is able to control lens position on the eye in primary gaze and/or translation amount across the surface of the eye when the eye changes from gazing at an object at a distance to gazing at a nearby object.

BACKGROUND

Contact lenses are widely used for correcting many different types of vision deficiencies. These include defects such as near-sightedness and far-sightedness (myopia and hypermetropia, respectively), and defects in near range vision usually associated with aging (presbyopia). Presbyopia occurs as a person ages when the lens of eye begins to crystalize and lose its elasticity, eventually resulting in the eye losing the ability to focus at near distances, such as the normal reading distance, and in some cases at intermediate distances. Some presbyopic persons have both near vision and far vision defects, requiring bifocal or multifocal lenses, instead of single vision lenses, to properly correct their vision.

A typical single vision contact lens has a focus, which is the point on which parallel rays of light focus when the lens is placed perpendicular to the parallel rays, and an optical axis, which is an imaginary line drawn from the focus to the center of the lens. A posterior surface fits against the cornea and an opposite anterior surface has a vision surface that focuses light to correct the eye's vision. In the case of a typical spherical lens, the vision surface has a single radius of curvature that is the distance from any point on the vision surface to a point on the optical axis referred to as the center of curvature.

A bifocal lens has at least two vision surfaces on the anterior surface of the lens: a distance vision surface, for gazing at far off objects, and a near vision surface, for gazing at close objects (e.g., while reading). Generally, bifocal contact lenses are concentric or segmented in configuration. In a conventional bifocal contact lens of the concentric type, a first, centrally located, circular correction zone constitutes either distant or near vision correction, while a second annular correction zone surrounding the first zone provides the corresponding near or distance vision correction, respectively. In a conventional bifocal contact lens of the segmented or translating type, the lens is divided into two optical zones. Usually the upper zone is for distance vision correction, whereas the lower zone is for near vision correction. With such a translating lens, the distance portion (upper zone) of the lens is in front of the pupil of the eye in straight-ahead gaze, while in downward gaze, the add power or near portion (lower zone) of the lens is over the pupil.

Effective use of a bifocal contact lens requires translation of the eye between vision surfaces when the eye changes from gazing at an object at a distance to gazing at a nearby object. In such a situation, the pupil must move from being subtended by the distance vision surface to being subtended by the near vision surface.

Additionally, with the increasing use of computers, more and more people utilize a computer at work and at home. It is desirable that a translating contact lens could have one or more intermediate vision surfaces in addition to the near and distant vision surfaces. Such a translating contact lens may have to have an ability to control the translation amount of the eye in a manner that the pupil can be subtended by one of near vision surface, intermediate vision surfaces, and distant vision surface.

While there are many designs for hard bifocal translating contact lenses, soft contact lenses have difficulty in translating across the surface of the eye when the visual direction of the eye changes from horizontal gaze (distance vision) to down gaze (near vision). There are several lens designs reported for soft bifocal translating lenses (see, for example, U.S. Pat. Nos. 4,618,277, 5,071,244, 5,371,976, 6,109,749). However, there are some disadvantages associated with those designs in the prior art. Bifocal translating contact lenses in the prior art are not comfortable to be worn. Furthermore, bifocal translating contact lenses in the prior art would be unable to control the translating amount of a contact lens across the surface of the eye.

Therefore, there is a need for a soft translating multi-focal contact lens that is capable of translating across the surface of the eye when the eye changes position from distance vision to near vision and providing wearer's comfort. There is also a need for a soft translating multi-focal contact lens that can control the amount of translation across the surface of the eye when the eye changes position from distance vision to an intermediate vision or to near vision.

SUMMARY OF THE INVENTION

The disadvantages of the prior art are overcome by the present invention which, in one aspect, is a translating contact lens having a central axis, an anterior surface and an opposite posterior surface. The posterior surface has an optical zone. The anterior surface includes an optical zone and a ramped ridge zone capable of controlling contact lens position on an eye in primary gaze and/or translating amount across the eye when the eye changes from gazing at an object at a distance to gazing at an object at an intermediate distance or at a nearby object. The ramped ridge zone is disposed below the optical zone and includes an upper edge, a lower ramped edge, a latitudinal ridge that extends outwardly from the anterior surface, and a ramp that extends dowardly from the lower ramped edge and has a curvature or slope that provides a varying degree of interaction between the ramped ridge zone and the lower eyelid depending on where the lower eyelid strikes the ramped ridge zone. The lower eyelid of the eye is engaged with at least some portion of the ramped ridge zone at all times.

In a preferred embodiment, at least one of the optical zones of the anterior and posterior surfaces includes a first portion to provide distant vision correction for the eye and a second portion disposed beneath the first portion to provide near vision correction for the eye.

In another preferred embodiment, at least one of the optical zones of the anterior and posterior surfaces has a top edge, a lower edge, a distance vision zone and a near vision zone.

The distance vision zone provides distance vision correction and has a first area that is sufficient to overlay a substantial portion of a pupil of an eye and is disposed in a first position within the optical zone so that the pupil is substantially subtended by the distance vision zone when the eye is gazing at a substantially horizontal point.

The near vision zone is substantially concentric with the central axis and extends radially outward from the distance vision zone. The near vision zone provides near vision correction and has a second area that is sufficient to overlay a substantial portion of a pupil of an eye. The near vision zone is disposed in a second position within the optical zone so that the pupil is substantially subtended by the near vision zone when the eye is gazing at a near vision point below the substantially horizontal point.

In another preferred embodiment, at least one of the optical zones of the anterior and posterior surfaces has a top edge, a lower edge, a distant vision zone, an intermediate vision zone, and a near vision zone. An optical zone including three vision zones can provide distance vision correction (e.g., driving), intermediate vision correction (e.g., working on computer), and near vision correction (e.g., reading books or newspapers). The intermediate vision zone is located between the distant vision zone and the near vision zone. The intermediate vision zone provides intermediate vision correction and has an area that is sufficient to overlay a substantial portion of the pupil and disposed in a position within the optical zone so that the pupil is substantially subtended by the intermediate vision zone when gazing at an intermediate vision point below the substantially horizontal point. Preferably, the intermediate vision zone is a progressive power zone having an optical power that continuously changes from distant vision to near vision.

In another preferred embodiment, at least one of the optical zones of the anterior and posterior surfaces has a top edge, a lower edge, and a cylindrical optical surface, or power, to correct for a wearer's astigmatism.

In another preferred embodiment, the anterior surface further comprises a ridge-off zone extending outwardly from the top edge of the optical zone of the anterior surface, a transition zone, and a lenticular zone. The ridge-off zone extends outwardly from the top edge of the optical zone. The transition zone extends from the lower edge of the optical zone to the upper edge of the ramped ridge zone and provides a smooth transition from the ramped ridge zone to the optical zone. The lenticular zone extends radially outward from the ridge-off zone and the lower ramped edge of the ramped ridge zone, that tapers to a narrow end (edge) where the posterior and anterior surfaces meet each other.

In another preferred embodiment, the entire ramped ridge zone is continuous in first derivative and/or in second derivative.

In another preferred embodiment, the latitudinal ridge in the ramped ridge zone is defined by one or more mathematical functions, preferably a conic or spline-based mathematical function, or is made of several different surface patches, and has a non-uniformly varying elevation profile. For example, the elevation heights at both ends of the latitudinal ridge are higher than the elevation heights in the middle of the latitudinal ridge. More preferably, the latitudinal ridge has a mirror symmetry with respect to a plan which cut the latitudinal ridge in the middle into two equal parts and contains the central axis of the contact lens. Such latitudinal ridge may provide increased wearer's comfort since the stress on the lower eyelid may be more uniformly distributed to the lens-interacting portion of the eyelid during lens translation.

The invention, in another aspect, provides a method for producing a translating contact lens. The method comprises the steps of shaping a contact lens by a manufacturing means to have a central axis, an anterior surface and an opposite posterior surface, wherein the posterior surface has an optical zone, wherein the anterior surface includes an optical zone and a ramped ridge zone capable of controlling contact lens position on an eye in primary gaze and/or translating amount across the eye when the eye changes from gazing at an object at a distance to gazing at an object at an intermediate distance or at a nearby object. The ramped ridge zone is disposed below the optical zone and includes an upper edge, a lower ramped edge, a latitudinal ridge that extends outwardly from the anterior surface, and a ramp that extends dowardly from the lower ramped edge and has a curvature or slope that provides a varying degree of interaction between the ramped ridge zone and the lower eyelid depending on where the lower eyelid strikes the ramped ridge zone. The lower eyelid of the eye is engaged with at least some portion of the ramped ridge zone at all times.

These and other aspects of the invention will become further apparent from the following detailed description of the presently preferred embodiments, read in conjunction with the accompanying figures. The detailed description and figures are merely illustrative of the invention and do not limit the scope of the invention, which is defined by the appended claims and equivalents thereof.

Figures 1A, 1B:
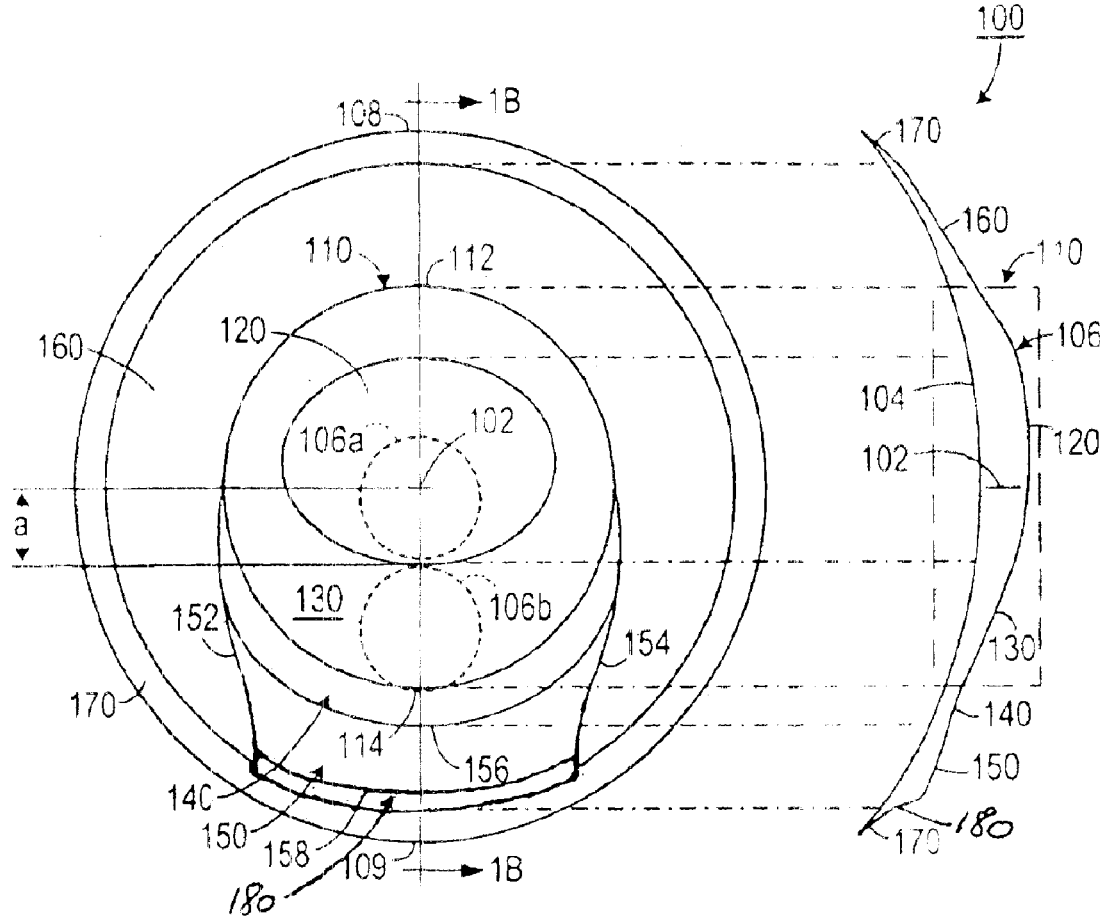
FIG. 1A is a front elevational view of a preferred embodiment of the invention.
FIG. 1B is a cross-sectional view, exaggerated along the horizontal axis, of the preferred embodiment shown in FIG. 1A, taken along line 1B—1B.
Figure 1C:
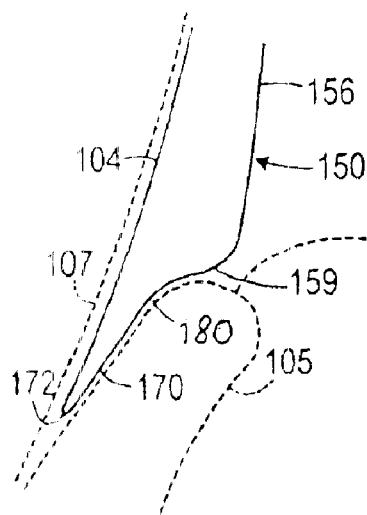
FIG. 1C is a detail view of a portion of FIG. 1B.

Repeat use of reference characters in the present specification and drawings is intended to represent same or analogous features or elements of the invention.

DETAILED DESCRIPTION OF THE PREFERRED EMBODIMENTS

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

As shown in FIG. 1A and FIG. 1B, a preferred embodiment of the invention is a contact lens 100 having a top 108, a bottom 109, a central axis 102, a posterior surface 104 and an opposite anterior surface 106. The anterior surface 106 includes an optical zone 110, a transition zone 140, a ramped ridge zone 150, a ridge-off zone 160 and a lenticular zone 170. The optical zone 110 has a lower edge 114 and includes a distance vision zone 120 and a near vision zone 130.

The distance vision zone 120 provides distance vision correction for the user. The area of the distance vision zone 120 is sufficient to overlay a substantial portion of a pupil 106a of a user. The distance vision zone 120 is disposed so that the user's pupil 106a is substantially subtended by the distance vision zone 120 when the user is gazing at a substantially horizontal point. Typically, the distance vision zone 120 will be offset from the central axis 102. But its curvature center is on or very close to the central axis 102. Preferably, the prism effect caused by the decentralization of the curvature center from the central axis is less or equal to 1 prism diopter. The distance a from the center 102 to the bottom of the distance vision zone 120 should be the minimum distance that allows the pupil 106a to be substantially subtended by the distance vision zone 120 when gazing at the horizon. This may result in the distance vision zone 120 having an oval shape.

The near vision zone 130 is substantially concentric with the central axis 102 and extends radially outward from the distance vision zone 120. The near vision zone 130 provides near vision correction for the user. The area of the near vision zone 130 is sufficient to overlay a substantial portion of the pupil 106b. The near vision zone 130 is disposed so that the user's pupil 106b is substantially subtended by the near vision zone 130 when the user is gazing at a near vision point below the substantially horizontal point (e.g., while reading). Both the distance vision zone 120 and near vision zone 130 could be place either on the posterior surface 104 or the anterior surface 106 of the lens 100.

The transition zone 140 provides a smooth transition from the ramped ridge zone 150 to the optical zone 110. The transition zone 140 extends from the lower edge 114 of the optical zone 110 to the upper edge of the ramped ridge zone 156.

The lens 100 can also include a ridge-off zone 160, which extends outwardly from the top edge 112 of the optical zone 110, the first side edge 152 of the ramped ridge zone 150 and the second side edge 154 of the ramped ridge zone 150. The ridge-off zone 160 adds lens rotational stability and improves the comfort of the lens 100. For added comfort and better corneal coverage, the lens 100 may also include a lenticular zone 170, extending radially outward from the ridge-off zone 160 and the lower ramped edge 158 of the ramped ridge zone 150, that tapers to a narrow end 172.

The ramped ridge zone 150 provides vertical translation support for the lens 100. The ramped ridge zone 150 is disposed below the optical zone 110. The ramped ridge zone 150 has an upper edge 156, a lower ramped edge 158, a first side edge 152, a second side edge 154, a latitudinal ridge 159 extends outwardly from the anterior surface 106, and a ramp 180 that extends downwardly from the lower ramped edge to the lenticular zone 170. When the eye 107 moves in a downward direction, the user's lower eyelid 105 can engage gradually first with the ramp 180, then the lower ramp edge 158 and finally the latitudinal ridge 159, thereby allowing translation of the lens 100 across the surface of the eye 107.

The transition from the lenticular zone 170 to the ramped ridge zone 150 is continuous in first derivative (tangent to each other), preferably continuous in second derivative. The ramp 180 has a curvature or slope that provides a varying degree of interaction between the ramped ridge zone and the lower eyelid depending on where the lower eyelid strikes the ramped ridge zone. With such ramp, the lower eyelid of the eye is engaged with at least some portion of the ramped ridge zone at all times and thereby effect the lens position on the eye in primary gaze (horizontal gaze) and/or lens translating amount across the surface of an eye when the eye changes from the horizontal (primary) gaze (distant vision) to a down gaze (intermediate or near vision).

One advantage of incorporating a ramp in the ramped ridge zone is that it can provide a smooth transition zone for the eyelid to "ramp up" the ridge. This gradual engagement will benefit the wearer by increasing comfort and reducing lens sensation in the eye because the ridge will always be engaged.

Another advantage of incorporating a ramp in the ramped ridge zone is that, since the ramp slope can determine lens position on an eye in primary gaze (horizontal), a lens design for a desired visual performance can be reliably implemented in the production of translating contact lenses.

Figure 2:
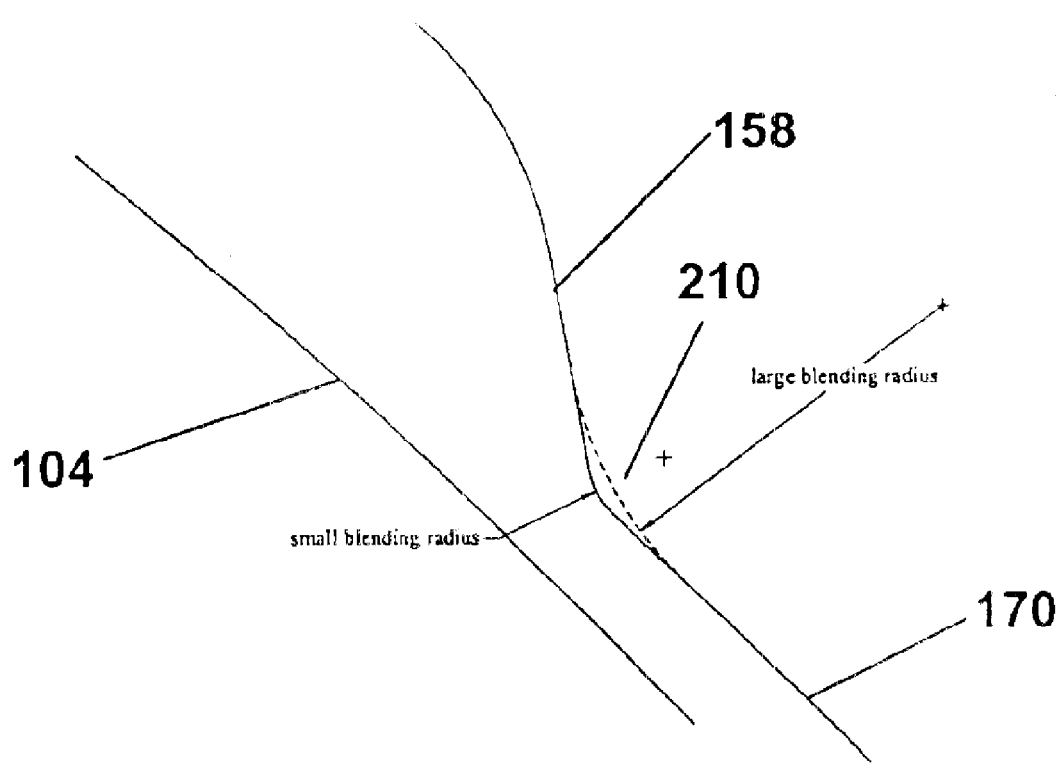
FIG. 2 schematically depicts the relationship between the ramp slope and the radius of a blending curve according to a preferred embodiment of the invention.

The ramp can be composed of one or more curved surfaces that ensure a continuous transition (continuous in first or second derivative) from the lenticular zone to the ramp and to the latitudinal ridge. For example, a ramp 210 is composed of a simple curvature as shown in FIG. 2. The slope of a ramp 210 depends on the radius of the curvature. Where a blending curvature has a large radius, the ramp 210 is longer and steep. Where a blending curvature has a small radius, the ramp 210 is shorter and flat.

For a bifocal translating contact lens having a design identical with or similar to that shown in FIG. 1A and FIG. 1B, the curvature of a ramp can have a radius of between 0.1 to 1.0 mm, preferably a radius of between 0.2 to 0.6 mm, to provide a desired lens position on the eye in the primary gaze.

In a preferred embodiment of the invention, the entire ramped ridge zone of a translating contact lens of the invention has a continuity in first derivative and/or in second derivative. Such ramped ridge zone can be a continuous surface defined by one or more mathematical functions, preferably by a conic or spline-based mathematical function, or is made of several different surface patches.

"Surface patches" refer to combinations of curvatures and lines that are continuous in first derivative, preferably in second derivative, from each other.

In another preferred embodiment, the lower ramp edge and the latitudinal ridge is morphed into a shape that will both help translation and improve comfort, for example, as shown in FIGS. 3A–3E and FIGS. 3F–3J.

FIGS. 3A–3E illustrate schematically a translating contact lens having preferred ramped ridge zone of the invention including a flattened lower ramp edge and a latitudinal ridge of a preferred ramped ridge zone. This preferred ramped ridge zone of the invention may accommodate better to the lower eyelid of the eye, and may distribute more uniformly translating stress over the entire lens-interacting portion of the lower eyelid. Therefore, with such ramped ridge, a translating contact lens may improve wearer's comfort.

FIGS. 3F–3J show schematically a translating contact lens 300 having a top 308, a bottom 309, a central axis 302, a posterior surface 304 and an opposite anterior surface 306. The anterior surface 306 includes an optical zone 310, a transition zone 340, a ramped ridge zone 350, a ridge-off zone 360 and a lenticular zone 370.

The ramped ridge zone 350 has an upper edge, a lower ramp edge, a latitudinal ridge extends outwardly from the anterior surface 306, and a ramp. The elevation height of the latitudinal ridge are higher at the both ends than in the middle (FIGS. 3F–3J). Two bumps (391, 392) forms at the two ends of the latitudinal ridge. The latitudinal ridge has a mirror symmetry with respect to a plan, which cuts the latitudinal ridge in the middle into two equal part and contains the central axis. Such latitudinal ridge can improve wearer's comfort, since translating stress may be uniformly distributed over the entire lens-interacting portion of the lower eyelid. Such a preferred feature of a ramped ridge zone can be achieved by using a continuous surface defined by a conic or spline-based mathematical function or made of several different surface patches.

Figure 4A:
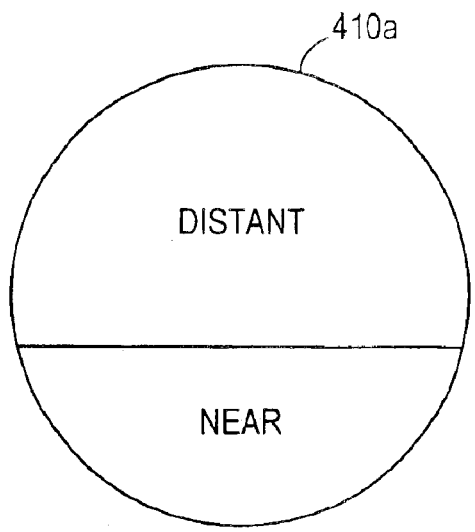
FIG. 4A is a front elevational view of an optical zone having horizontal distance vision and near vision zones.
Figure 4B:
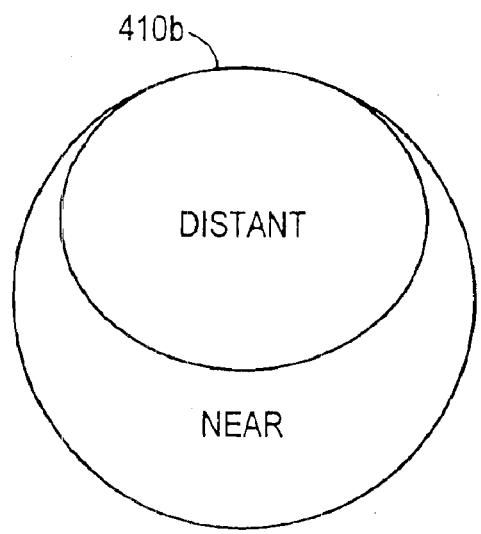
FIG. 4B is a front elevational view of an optical zone having a non-circular distance vision zone.
Figure 4C:
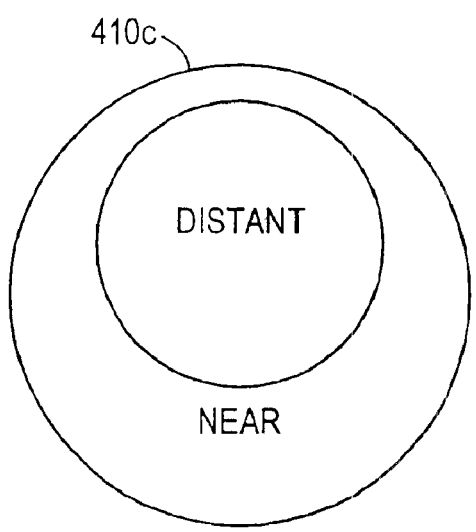
FIG. 4C is a front elevational view of an optical zone having circular distance vision and near vision zones.

As will be readily appreciated by those of skill in the art, many different shapes of vision zones are possible with the present invention. The optical zone (410a, 410b or 410c) of a contact lens of the invention can have the shaped vision zones shown in FIGS. 4A–4C.

As also will be readily appreciated by those of skill in the art, the above-described bifocal optics can be replaced with a trifocal or a multi-focal optics to make a multi-focal translating contact lens. A "multi-focal translating contact lens" refers to a translating contact lens that comprises bifocal, trifocal or multi-focal optics.

The optical zone of at least one of the anterior and posterior surfaces of a multi-focal translating contact lens can include a distant vision zone, an intermediate vision zone, and a near vision zone, from the top to the bottom of the contact lens. The multi-focal translating contact lens of the invention has a ramped ridge zone of the invention on the lower portion of the anterior surface of the contact lens. The ramped ridge zone interacts with the lower eyelid to influence lens motion relative to the cornea and thereby the translating amount across the surface of the eye. The multi-focal translating contact lens can provide distant vision correction at a primary gaze (e.g. driving), intermediate vision correction at a half-down-gaze (e.g. work on computer) and near vision correction at full-down-gaze (e.g. read books and newspaper).

A preferred embodiment of the optical zone of at least one of the anterior and posterior surfaces of a multi-focal translating contact lens of the invention has a distant vision zone, an intermediate vision zone extending radially outward from the distance vision zone, and a near vision zone extending radially outward from the intermediate vision zone. The distance vision zone provides distance vision correction and having a first area that is sufficient to overlay a substantial portion of the pupil of the eye and disposed in a first position within the optical zone so that the pupil is substantially subtended by the distance vision zone when gazing at a substantially horizontal point. The intermediate vision zone provides intermediate vision correction and having a second area that is sufficient to overlay a substantial portion of the pupil and disposed in a second position within the optical zone so that the pupil is substantially subtended by the intermediate vision zone when gazing at an intermediate vision point below the substantially horizontal point. The near vision zone provides near vision correction and having a third area that is sufficient to overlay a substantial portion of the pupil and disposed in a third position within the optical zone so that the pupil is substantially subtended by the near vision zone when gazing at a near vision point below the intermediate vision point. When the eye changes position from distance vision (e.g. driving) to an intermediate vision (e.g. working on computer) or to near vision (e.g., reading books or newspapers), the amount of translation across the surface of the eye is controlled by the ramped ridge zone on the lower portion of the anterior surface of the multi-focal translating contact lens.

Figure 5:
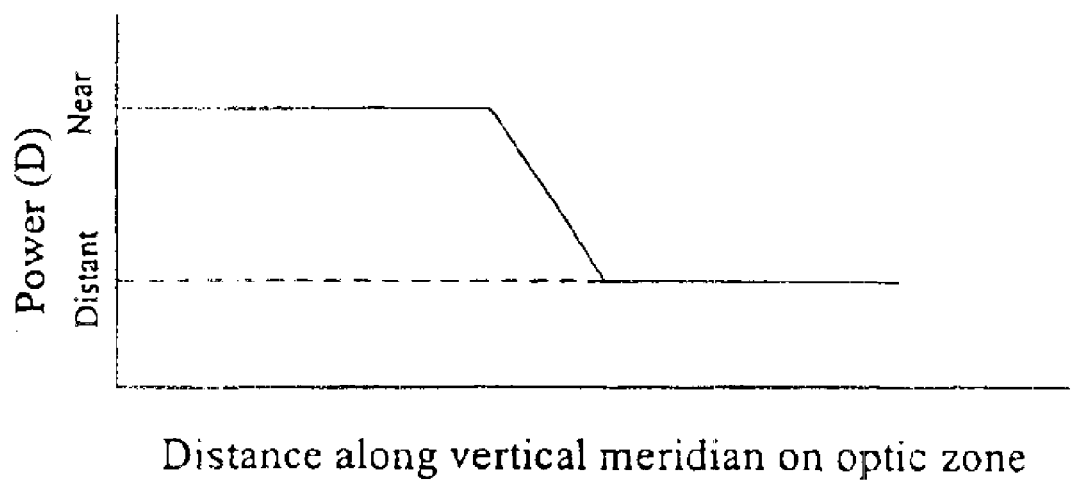
FIG. 5 is a schematic representation of a optical power profile of an optical zone having progressive optical powers.

A preferred embodiment of the intermediate vision zone in a multi-focal translating lens of the invention is a progressive power zone, which has an optical power that continuously changes from the distant vision to the near vision (FIG. 5).

Effective use of a trifocal translating contact lens or a multi-focal translating contact lens having a progressive power zone requires varying amounts of translation across the surface of the eye when the eye changes from gazing at an object at a distance (primary gaze) to gazing at an object at an intermediate distance (partially-down or half-down gaze) or to gazing at a nearby object (fully-down gaze). Such requirement related to varying amounts of translation can be achieved by varying the curvature or slope of the ramp in the ramped ridge zone, since degrees of eyelid interaction depend upon the curvature or slope of the ramp and upon the looseness of the lower eyelid of an eye. A correlation between amounts of translation and the curvature or slope of the ramp for a give individual can be established empirically by a person skilled in the art. Preferably, a correlation between amounts of translation and the curvature or slope of the ramp is derived from population studies.

As will be readily appreciated by those of skill in the art, a ramped ridge zone of the invention can be incorporated in a toric soft contact lens that has a cylindrical optical surface, or power, to correct for the wearer's astigmatism. A toric contact lens requires features that provide a predetermined orientation on the eye. A preferred embodiment of the invention is to provide a toric soft contact lens, which comprises a posterior surface and an opposite anterior surface. The anterior surface includes an optical zone and a ramped ridge zone on the lower portion of the anterior surface, wherein the first derivative of the anterior surface is continuous from the center to the edge. Preferably, the second derivative of the anterior surface is continous from the center to the edge.

A translating contact lens of the invention typically would be made from a soft contact lens material, such as a silicon hydro-gel or HEMA. It will be understood that any lens described above comprising any soft contact lens material would fall within the scope of the invention.

A translating contact lenses of the invention may be produced by any convenient means, for example, such as lathing and molding. Preferably, contact lenses are molded from contact lens molds including molding surfaces that replicate the contact lens surfaces when a lens is cast in the molds. For example, an optical cutting tool with a numerically controlled lathe may be used to form a metallic optical tool incorporating the features of the anterior surface of a translating contact lens of the invention. The tool is then used to make anterior surface molds that are then used, in conjunction with posterior surface molds, to form the lens of the invention using a suitable liquid lens-forming material placed between the molds followed by compression and curing of the lens-forming material.

Preferably, a contact lens having complicated surface feature or the optical tool to be used for making the same is fabricated by using a numerically controlled lathe, for example, such as Optoform ultra-precision lathes (models 30, 40, 50 and 80) having Variform piezo-ceramic fast tool servo attachment from Precitech, Inc, according to a method described in co-pending U.S. Patent Application No., entitled Method for Manufacturing a contact lens, herein incorporated by reference in its entirety.

Figure 3B:
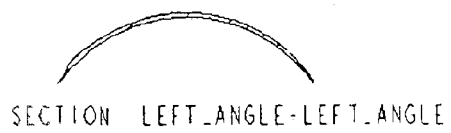
FIGS. 3A–3E schematically illustrate a translating contact lens having a ramped ridge zone including a flattened lower ramp edge and a flattened latitudinal ridge according to a preferred embodiment of the invention.
Figure 3C:
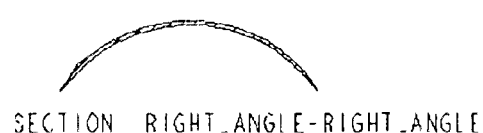
Figure 3D:
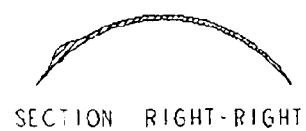
Figure 3E:
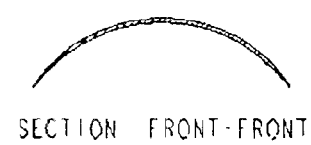
Figure 3A:
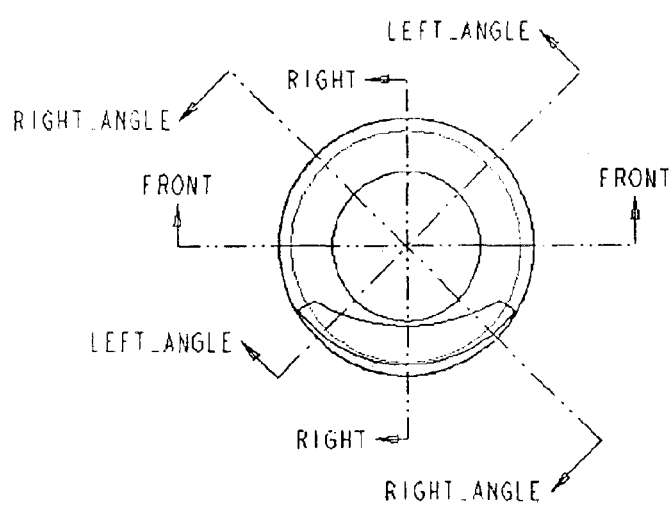
Figure 3G:
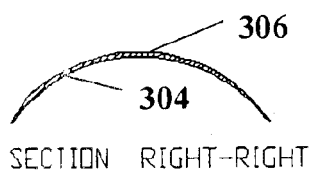
FIGS. 3F–3J schematically show a translating contact lens having a ramped ridge zone including two bumps at the two ends of a latitudinal ridge according to a preferred embodiment of the invention.
Figure 3H:
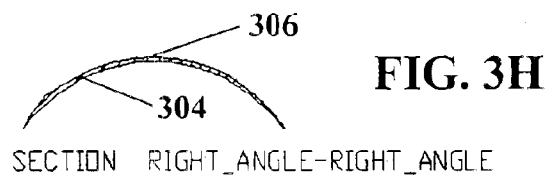
Figure 3I:
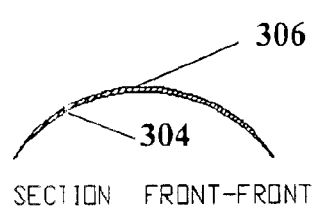
Figure 3J:
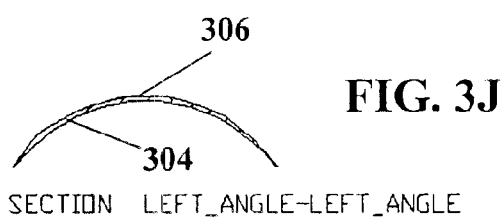
Figure 3F:
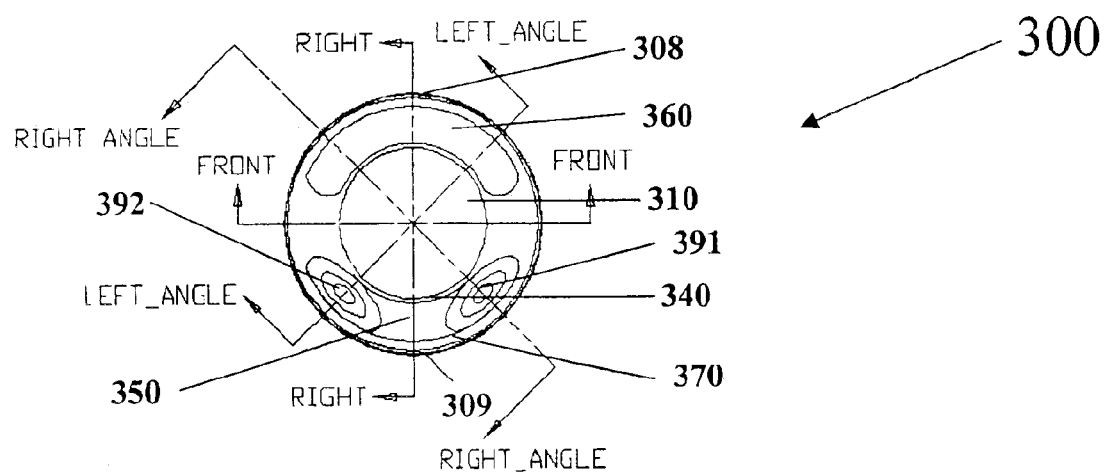

As an illustrative example, production of a translating contact lens having a ramped ridge zone shown in FIG. 3F is described as follows.

First, an user defines a set of parameters, such as a surface tolerance, a concentricity tolerance, orientation of the lens design, the number of spokes to be generated for each of the anterior and posterior surfaces, creating zero point at 0,0, orientation of Z-axis, and type of lens surface (concave or convex surface) to be converted into a geometry.

A "surface tolerance" refers to the allowed position-deviation of a projected point from an ideal position on a surface of a lens design. The deviation can be in the direction either parallel or perpendicular to the central axis of a lens design.

A "concentricity tolerance" refers to the allowed deviation of a point from a given arc.

A "spoke" refers to a ray radiating outwardly from the central axis and is perpendicular to the central axis.

A "semi-diameter spoke" refers to a line segment from the central axis to the edge of a lens design.

"Evenly-spaced semi-diameter spokes" means that all semi-diameter spokes radiate outwardly from the central axis and separate from each other by one equal angle.

A "point spacing" refers to a distance between two points along the semi-diameter spoke.

Second, an user determines the number of points to be projected onto the a surface of the lens design (for example, the anterior surface) along each of the number of evenly-spaced semi-diameter spokes in a direction parallel to the central axis. A semi-diameter spoke at an azimuthal angle, at which one of the two bumps of the anterior surface is located, is selected as the semi-diameter probing spoke. Evenly-spaced points are projected along the semi-diameter probing spoke, in which each pairs of points are separating by a point spacing of 10 microns. Then, all of the projected points are divided into a series of groups, each group composed of three consecutive points, a first point, a middle point and a third point. Each of the points can belong to either one group or two groups. One group at a time from the central axis to the edge or from the edge to the central axis, the curvature of the surface at the middle point of the group is analyzed by comparing a distance between the middle point and a line linking the first point and the third point of the corresponding group with the predetermined surface tolerance. If the distance between the middle point and the line linking the first and third points of the group is larger than the predetermined surface tolerance, the curvature of the surface at that point is sharp and an additional point is projected between the first and the middle points in that group. The point spacing between the first and additional points is equal to point spacing between the additional and middle points. After adding an additional point, all of the points included the newly added point is regrouped again and the curvature of the surface at the middle point of each of the series of groups is analyzed. Such iterative procedure is repeated until the distance between the middle point of each of the series of groups and the line linking the first and the third points of corresponding group along the probing spoke is equal to or less than the predetermined surface tolerance. In this way, the number of the points to be projected onto the surface of the lens design along each of the desired number of evenly-spaced semi-diameter spokes and point spacings for a series of pairs of neighboring points are determined.

The above-determined number of points are projected onto the anterior surface of the lens design shown in FIG. 3F along each of 96 semi-diameter spokes. For each of the semi-diameter spokes, a semi-meridian which is continuous in first derivative is generated. The semi-meridian includes a series of arcs and optionally straight lines, wherein each arc is defined by fitting at least three consecutive points into a spherical mathematical function within a desired concentricity tolerance. Each of the straight lines is obtained by connecting at least three consecutive points. Preferably, arc fitting routine is started from the central axis to the edge.

Similarly, conversion of the posterior surface of the lens design shown in FIG. 3F into a geometry can be carried out according to the above described procedure.

After converting the lens design shown in FIG. 3F to a geometry of a contact lens to be produced in a manufacturing system, a mini-file containing both the information for the header and the information about the geometry of the lens is generated. This mini-file also contains a zero semi-meridian that is based on the average height of each of the other meridians at each of radial locations and that gives the Variform a zero position on which it can base its oscillation calculations. In this mini-file, all semi-meridians have the same number of zones. This is accomplished by copying the last zone of a semi-meridian for a number of time to equalize the numbers of zones for all meridians. After the mini-file is complete, it is loaded into an Optoform ultra-precision lathe (models 30, 40, 50 or 80) having Variform piezo-ceramic fast tool servo attachment and run to produce a translating contact lens.

In another embodiment, the present invention provides a method for producing a translating contact lens of the invention. The method comprises the steps of shaping a contact lens by a manufacturing means to have a central axis, an anterior surface and an opposite posterior surface, wherein the posterior surface has an optical zone, wherein the anterior surface includes an optical zone and a ramped ridge zone capable of controlling contact lens position on an eye in primary gaze and/or translating amount across the eye when the eye changes from gazing at an object at a distance to gazing at an object at an intermediate distance or at a nearby object, wherein the ramped ridge zone is disposed below the optical zone and includes an upper edge, a lower ramped edge, a latitudinal ridge that extends outwardly from the anterior surface, and a ramp that extends dowardly from the lower ramped edge and has a curvature or slope that provides a varying degree of interaction between the ramped ridge zone and the lower eyelid depending on where the lower eyelid strikes the ramped ridge zone. The lower eyelid of the eye is engaged with at least some portion of the ramped ridge zone at all times.

The invention has been described in detail, with particular reference to certain preferred embodiments, in order to enable the reader to practice the invention without undue experimentation. A person having ordinary skill in the art will readily recognize that many of the previous components, compositions, and/or parameters may be varied or modified to a reasonable extent without departing from the scope and spirit of the invention. Furthermore, titles, headings, example materials or the like are provided to enhance the reader's comprehension of this document, and should not be read as limiting the scope of the present invention. Accordingly, the invention is defined by the following claims, and reasonable extensions and equivalents thereof.

What is claimed is:

1. A translating contact lens having a central axis, an anterior surface and an opposite posterior surface having a first optical zone, the anterior surface comprising:
   a second optical zone having a top edge and a lower edge;
   a non-optical zone surrounding the second optical zone; and
   a lenticular zone which extends radially outward from the non-optical zone and tapers to a narrow end where the posterior and anterior surfaces meet each other,
wherein the non-optical zone has a ramped ridge zone capable of controlling contact lens position on an eye in primary gaze or translating amount across the eye when the eye changes from gazing at an object at a distance to gazing at an object at an intermediate distance or to gazing at a nearby object, or both,
wherein the ramped ridge zone is disposed below the second optical zone and includes an upper edge, a lower ramped edge, a latitudinal ridge that extends outwardly from the anterior surface, and a ramp that extends downwardly from the lower ramped edge to the lenticular zone, and
wherein the ramp ensures a continuous transition from the lenticular zone to the latitudinal ridge and has a radius of curvature of between 0.1 to 1.0 mm.

2. A translating contact lens at claim 1, wherein at least one of the first and second optical zones includes:
   a distance vision zone for distance vision correction, the distance vision zone having a first area that is sufficient to overlay a substantial portion of the pupil of the eye and disposed in a first position within the optical zone so that the pupil is substantially subtended by the distance vision zone when gazing at a substantially horizontal point; and
   a near vision zone for near vision correction, the near vision zone extending radially outward from the distance vision zone and having a second area that is sufficient to overlay a substantial portion of the pupil and disposed in a second position within the optical zone so that the pupil is substantially subtended by the near vision zone when gazing at a near vision point below the substantially horizontal point.

3. A translating contact lens of claim 2, wherein the non-optical zone further comprises:
   a ridge-off zone extending outwardly from the top edge of the second optical zone;
   a transition zone extending from the lower edge of the second optical zone to the upper edge of the ramped ridge zone, wherein the transition zone provides a smooth transition from the ridge zone to the second optical zone.

4. A translating contact lens of claim 3, wherein the curvature center of the distance vision zone is on or very close to the central axis.

5. A translating contact lens of claim 4, wherein prism effect caused by the deviation of the curvature center of the distance vision zone from the central axis is less or equal to 1 prism diopter.

6. A translating contact lens of claim 3, wherein the distance vision zone has an oval shape.

7. A translating contact lens of claim 3, wherein the ramped ridge zone comprises a first side edge and a second side edge, wherein the ridge-off zone extends outwardly from the top edge of the second optical zone, first side edge of the ramped ridge zone and the second side edge of the ramped ridge zone, and wherein the ridge-off zone has sufficient area so that the ridge-off zone, the second optical zone, the ramped ridge zone and the transition zone cover substantially all of the cornea of the eye.

8. A translating contact lens of claim 7, wherein the ramp has a radius of curvature of between 0.2 to 0.4 mm.

9. A translating contact lens of claim 2, wherein the entire ramped ridge zone is continuous in first derivative or in second derivative or both.

10. A translating contact lens of claim 9, wherein the ramped ridge zone is defined by e spline-based mathematical function or made of several different surface patches.

11. A translating contact lens of claim 2, wherein the anterior surface is continuous in first derivative or in second derivative or both from center to edge.

12. A translating contact lens of claim 2, wherein the latitudinal ridge has a non-uniformly varying elevation profile.

13. A translating contact lens of claim 12, wherein the latitudinal ridge has a mirror symmetry with respect to a plan which cut the latitudinal ridge in the middle into two equal parts and contains the central axis.

14. A translating contact lens of claim 2, wherein the contact lens is a soft contact lens.

15. A translating contact lens of claim 1, wherein at least one or the first and second optical zones includes:
   a distance vision zone for distance vision correction, the distance vision zone having a first area that is sufficient to overlay a substantial portion of the pupil of the eye and disposed in a first position within the optical zone so that the pupil is substantially subtended by the distance vision zone when gazing at a substantially horizontal point;
   an intermediate vision zone for intermediate vision correction, the intermediate vision zone extending radially outward from the distance vision zone and having a second area that is sufficient to overlay a substantial portion of the pupil and disposed in a second position within the optical zone so that the pupil is substantially subtended by the intermediate vision zone when gazing at an intermediate vision point below the substantially horizontal point; and
   a near vision zone for near vision correction, the near vision zone extending radially outward from the intermediate vision zone and having a third area that is sufficient to overlay a substantial portion of the pupil and disposed in a third position within the optical zone so that the pupil is substantially subtended by the near vision zone when gazing at a near vision point below the intermediate vision point.

16. A translating contact lens of claim 15, wherein the non-optical zone further comprises:
   a ridge-off zone extending outwardly from the top edge of the second optical zone;
   a transition zone extending from the lower edge of the second optical zone to the upper edge of the ramped ridge zone that provides a smooth transition from the ridge zone to the second optical zone.

17. A translating contact lens of claim 16, wherein the ramped ridge zone comprises a first side edge and a second side edge, wherein the ridge-off zone extends outwardly from the top edge of the second optical zone, first side edge of the ramped ridge zone end the second side edge of the ramped ridge zone, and wherein the ridge-off zone has sufficient area so that the ridge-off zone, the second optical zone, the ramped ridge zone and the transition zone cover substantially all of the cornea of the eye.

18. A translating contact lens of claim 15, wherein the entire ramped ridge zone is continuous in first derivative or in second derivative or both.

19. A translating contact lens of claim 18, wherein the ramped ridge zone is defined by a spline-based mathematical function or made of several different surface patches.

20. A translating contact lens of claim 15, wherein the anterior surface is continuous in first derivative or in second derivative or both from center to edge.

21. A translating contact lens of claim 15, wherein the latitudinal ridge has a non-uniformly varying elevation profile.

22. A translating contact lens of claim 21, wherein the latitudinal ridge has a mirror symmetry with respect to a plan which cut the latitudinal ridge in the middle into two equal parts and contains the central axis.

23. A translating contact lens of claim 15, wherein the contact lens is a soft contact lens.

24. A translating contact lens at claim 15, wherein the intermediate vision zone is a progressive power zone having an optical power that continuously changes from distant vision to near vision.

25. A translating contact lens of claim 1, wherein at least one of the first and second optical zones includes a cylindrical optical surface to correct astigmatism.

26. A translating contact lens of claim 25, wherein the non-optical zone further comprises:
   a ridge-off zone extending outwardly from the top edge of the second optical zone;
   a transition zone extending from the lower edge of the second optical zone to the upper edge of the ramped ridge zone that provides a smooth transition from the ridge zone to the second optical zone.

27. A translating contact lens of claim 26, wherein the entire ramped ridge zone is continuous in first derivative or in second derivative or both.

28. A translating contact lens of claim 27, wherein the ramped ridge zone is defined by a spline-based mathematical function or made of several different surface patches.

29. A translating contact lens of claim 26, wherein the anterior surface is continuous in first derivative or in second derivative or both from center to edge.

30. A translating contact lens of claim 26, wherein the latitudinal ridge has a non-uniformly varying elevation profile.

31. A translating contact lens of claim 30, wherein the latitudinal ridge has a mirror symmetry with respect to a plan which cut the latitudinal ridge in the middle into two equal parts and contains the central axis.

32. A translating contact lens of claim 26, wherein the contact lens is a soft contact lens.

33. A translating contact lens of claim 1, wherein at least one of the first and second optical zones includes a first portion for distant vision correction and a second portion beneath the first portion for near vision correction.

34. A translating contact lens of claim 2, wherein the second portion is disposed beneath the central axis.

35. A translating contact lens of claim 33, wherein the non-optical zone further comprises:
   a ridge-off zone extending outwardly from the top edge of the second optical zone;
   a transition zone extending from the lower edge of the second optical zone to the upper edge of the ramped ridge zone that provides a smooth transition from the ridge zone to the second optical zone.

36. A translating contact lens of claim 35, wherein the entire ramped ridge zone is continuous in first derivative or in second derivative or both.

37. A translating contact lens of claim 36, wherein the ramped ridge zone is defined by a spline-based mathematical function or made of several different surface patches.

38. A translating contact lens of claim 35, wherein the anterior surface is continuous in first derivative or in second derivative or both from center to edge.

39. A translating contact lens of claim 35, wherein the latitudinal ridge has a non-uniformly varying elevation profile.

40. A translating contact lens of claim 39, wherein the latitudinal ridge has a mirror symmetry with respect to a plan which cut the latitudinal ridge in the middle into two equal parts and contains the central axis.

41. A translating contact lens of claim 35, wherein the contact lens is a soft contact lens.

42. A translating contact lens of claim 33, wherein at least one of the first and second optical zones includes a first portion for distant vision correction, a second portion beneath the first portion for intermediate vision correction, and a third portion beneath the second portion for near vision correction.

43. A translating contact lens of claim 42, wherein the second portion has an optical power that continuously changes from distant vision to near vision.

44. A method for producing a translating contact lens, comprising the steps of designing a contact lens which includes a central axis, an anterior surface and an opposite posterior surface, wherein the posterior surface has a first optical zone, wherein the anterior surface includes a second optical zone, a non-optical zone surrounding the second optical zone, and a lenticular zone which extends radially outward from the non-optical zone and tapers to a narrow end where the posterior and anterior surfaces meet each other, wherein the non-optical zone includes a ramped ridge zone capable of controlling contact lens position on an eye in primary gaze or translating amount across the eye when the eye changes from gazing at an object at a distance to gazing at an object at an intermediate distance or at a nearby object or both, wherein the ramped ridge zone is disposed below the optical zone and includes an upper edge, a lower ramped edge, a latitudinal ridge that extends outwardly from the anterior surface, and a ramp that extends downwardly from the lower ramped edge to the lenticular zone, and wherein the ramp ensures a continuous transition from the lenticular zone to the latitudinal ridge has a radius of curvature of between 0.1 to 1.0 mm.

45. A method of claim 44, wherein the anterior surface is continuous in first derivative or in second derivative or both from center to edge.

46. A method of claim 45, wherein the latitudinal ridge has a non-uniformly varying elevation profile.

47. A method of claim 46, wherein the latitudinal ridge has a mirror symmetry with respect to a plan which cut the latitudinal ridge in the middle into two equal parts and contains the central axis.

48. A method of claim 44, wherein said method further comprises a step of shaping the designed contact lens by using a numerically controlled lathe or molds.

* * * * *